United States Patent [19]
Vukovich et al.

[11] 4,167,993
[45] Sep. 18, 1979

[54] CLUTCH WITH INERTIA CONTROL VALVE

[75] Inventors: William J. Vukovich, Ypsilanti; Mark A. Willett, Pinckney, both of Mich.

[73] Assignee: General Motors Corporation, Detroit, Mich.

[21] Appl. No.: 850,476

[22] Filed: Nov. 11, 1977

[51] Int. Cl.² ............................................. F16D 43/24
[52] U.S. Cl. .................................. 192/3.3; 192/103 C
[58] Field of Search ................. 192/3.3, 103 C, 103 F

[56] References Cited

U.S. PATENT DOCUMENTS

| | | | |
|---|---|---|---|
| 2,022,058 | 5/1935 | Gregg | 192/103 C |
| 3,578,120 | 5/1971 | Hilpert | 192/103 C |
| 3,642,107 | 2/1972 | Borman et al. | 192/103 F |
| 3,693,478 | 9/1972 | Malloy | 192/3.3 |
| 3,913,715 | 10/1975 | Groves | 192/103 FA |

Primary Examiner—Benjamin W. Wyche
Attorney, Agent, or Firm—Donald F. Scherer

[57] ABSTRACT

An engagement control valve for a lock-up clutch operable to control the clutch engagement force in response to the angular acceleration of the clutch. The valve has one member rotatable with the clutch and another member resiliently connected with the one member. The valve members cooperate to control the fluid passage such that, on sufficiently high angular acceleration of the clutch, the passage is open to reduce the engagement force of the clutch thus preventing the transmission of torsional vibrations which are not damped by a conventional damper.

3 Claims, 4 Drawing Figures

CLUTCH WITH INERTIA CONTROL VALVE

This invention relates to clutch engagement controls and more particularly to acceleration responsive clutch engagement control valves.

It is an object of this invention to provide in an improved clutch engagement control valve for modulating the clutch engagement force in response to rotary acceleration of the clutch.

It is another object of this invention to provide an improved clutch engagement control valve responsive to the acceleration of the clutch wherein the valve has one member secured for rotation at clutch input speed and a second member resiliently connected to the one member whereby relative movement occurs between the valve members upon a predetermined acceleration of the clutch to open the valve for modulating the clutch engagement pressure force thereby preventing the transmission of torsional vibrations associated with the acceleration.

These and other objects and advantages of the present invention will be more apparent from the following description and drawings in which.

Figure 1:
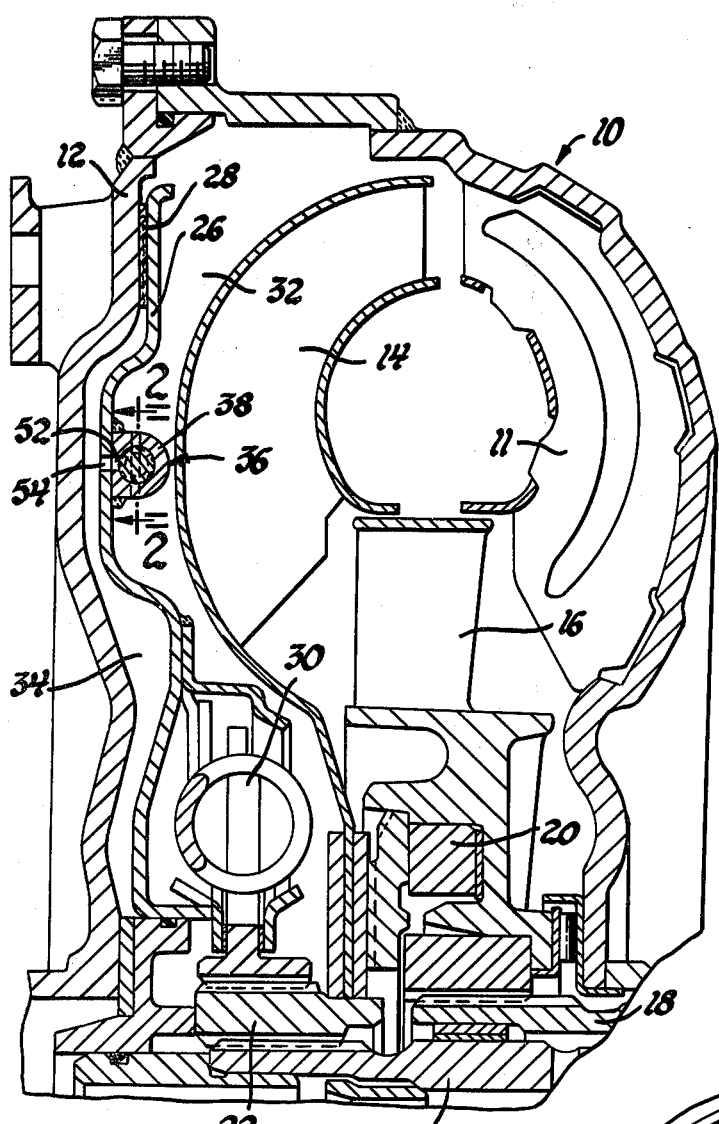
FIG. 1 is a cross-sectional side view of a torque converter and lock-up clutch having a control valve therein.

Referring to the drawings, in particular FIG. 1, there is shown a torque converter, generally designated 10, having an impeller 11 which is connected to be driven directly by an engine through an input shell 12. The converter 10 also includes a turbine member 14 and a stator 16 which cooperate with the impeller 11 to provide a well known fluid drive device. The stator 16 is splined to a stationary stator shaft 18 through a one way clutch 20 in a well known manner. The turbine 14 is secured to a hub 22 which in turn is splined to a torque converter output shaft 24.

Disposed between the input shell 12 and the turbine 14 is a clutch pressure plate 26 which has secured thereto a friction lining 28 adapted to engage the input shell 12 thereby providing a direct friction drive connection between the clutch pressure plate 26 and the input shell 12. The clutch pressure plate 26 has secured thereto a conventional torsional vibration damper 30, which damper 30 is splined to the hub 22. The system described thus far is substantially a conventional lock-up clutch for a torque converter wherein fluid pressure is admitted to the chamber 32, between the turbine 14 and the clutch pressure plate 26, to engage the clutch and fluid pressure is admitted to the chamber 34, between the input shell 12 and the clutch pressure plate 26, to disengage the clutch. These types of lock-up clutches in combination with the torque converter are well known and well defined in the art and therefore it is considered that those skilled in the art will be knowledgable in the operation of such clutching arrangements.

Figure 2:
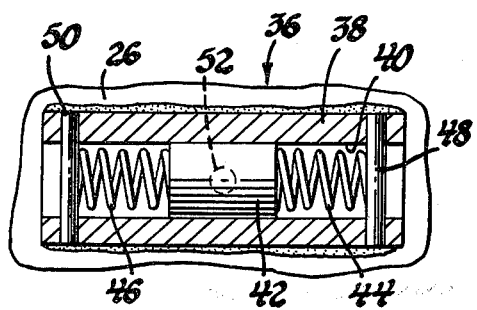
FIG. 2 is a cross-sectional view taken along the line 2—2 of FIG. 1.

A clutch control valve assembly 36 is secured to the clutch pressure plate 26. This is most clearly seen in FIGS. 1 and 2. The control valve 36 is comprised of a housing 38 secured to the pressure plate 26. The housing 38 has an axially extending bore 40 in which is slidably disposed a valve member 42. The valve member 42 is centrally located in the bore 40 by a pair of compression springs 44 and 46 which are maintained within the valve bore 40 by pins 48 and 50 respectively. Both ends of bore 40 are open to the chamber 32. The housing 38 has formed therein a passageway 52 which is aligned with a passage 54 formed in the pressure plate 26. As seen in FIG. 2 when the valve member 42 is spring centered the aligned passages 52 and 54 are closed from the chamber 32.

The valve 36 is disposed on the pressure plate 26 perpendicular to a radius of the pressure plate 26 such that the valve member 42 will be responsive to angular accelerations of the clutch pressure plate. Thus if the clutch pressure plate accelerates at a sufficiently high level the valve member 42 will be moved in the bore 40 relative to the housing 38 a sufficient amount to permit fluid communication between the valve bore 40 and the openings 52 and 54 thereby providing fluid communication between chambers 32 and 34. Assuming the clutch has been engaged by fluid pressure in the chamber 32, the opening of passages 52 and 54 will reduce the differential pressure across the pressure plate 26 thereby decreasing the engagement force of the clutch such that a slipping condition can occur thereby preventing the passage of torsional vibrations which are the cause of the high angular accelerations of the clutch plate 26.

The limit of change in angular acceleration which can be allowed to occur without a substantial reduction in clutch capacity is controlled by the mass of the valve 42, the spring rate of the springs 44 and 46, the amount by which the valve 42 overlaps the opening 52, the dampening provided by the viscous friction or possible bleed orifices which can be included in a valve bore 40, and the spring rate of damper 30.

Figure 3:
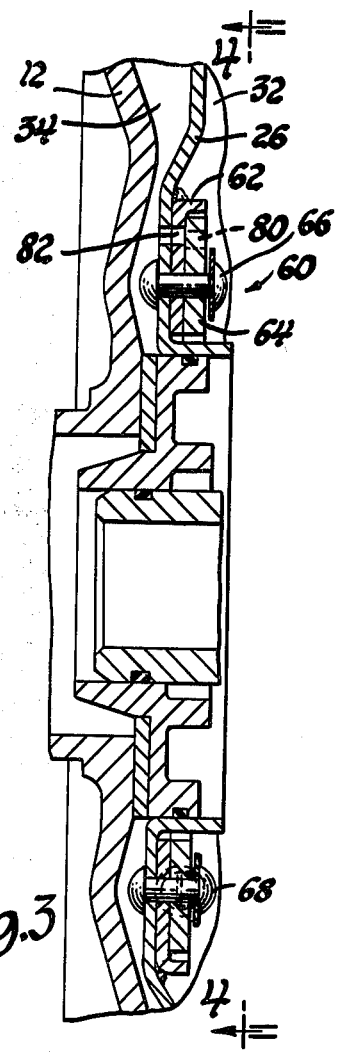
FIG. 3 is a partial sectional side view of a clutch and converter showing a modification of the invention.
Figure 4:
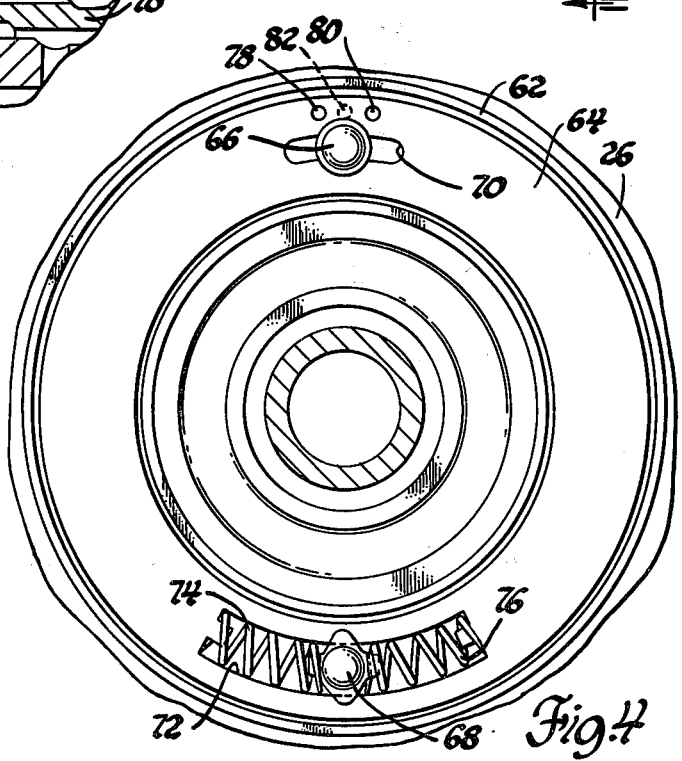
FIG. 4 is a view taken along the line 4—4 of FIG. 3.

In the modifications shown in FIGS. 3 and 4 substantially the same input shell 12 and clutch pressure plate 26 are utilized. The control valve however has a substantially different form that is generally designated 60. The control valve consists of a cup shaped member 62 which is secured to the clutch pressure plate 26 and a disc member 64 which is rotatably disposed relative to the cup member 62. A pair of pin members 66 and 68 are operable to maintain the proper alignment between cup member 64 and disc member 62. The pin member 66 is secured in the pressure plate 26 and cup member 62 and passes freely through a slot 70 formed in the disc member 64. The pin member 68 is secured in the clutch pressure plate 26 and cup member 62 and passes freely through a slot 72 formed in the disc member 64. The slot 72 is substantially longer and wider than the slot 70 and has disposed therein a pair of springs 74 and 76 which maintain the disc 64 in an attitude relative to the cup member 62 such that a pair of openings 78 and 80 are radially displaced from an opening 82 formed in the cup member 62 and pressure plate 26. Assuming the angular acceleration rate of the clutch remains low, the springs 74 and 76 prevent the alignment of either openings 78 or 80 with the opening 82 and thereby maintaining the maximum clutch engagement force. However should the acceleration of the clutch plate exceed a predetermined level the disc member 64 will be rotated relative to the cup member 62 a sufficient amount such that either opening 78 or 80 will be aligned with opening 82 thereby permitting fluid communication between the pressure chambers 32 and 34 such that, as described previously, the clutch engagement force will be lessened thereby preventing the transmission of torsional vibrations.

It should be recognized that the engagement control valves 36 and 60 will function either on acceleration or deceleration (negative acceleration) and for the purposes of this disclosure the term "acceleration" is used to define both positive acceleration and negative acceleration. Thus the control valve will be operable both when the engine is driving the torque converter and, during vehicle coasting, when the torque converter is driving the engine, since the connection between chambers 32 and 34 can be made by either of the control valves 36 or 60 when the flow controlling elements valve, 42 or disc 64, are moved in either direction from their central location. The amount of movement of the control elements, valve 42 and disc 64, will control the amount of opening of the inter-connecting passages 52 or 82 such that modulation of the differential clutch pressure is readily accomplished.

Obviously, many modifications and variations of the present invention are possible in light of the above teaching. It is therefore to be understood, that within the scope of the appended claims the invention may be practiced otherwise than as specifically described.

What is claimed is:

1. A control valve for a torque converter lock-up clutch wherein the clutch engagement is controlled by fluid pressure in chambers on opposite sides of a pressure plate and wherein the clutch is subjected to engine torsional vibrations, said control valve comprising; valve means responsive to angular acceleration of the clutch for inter-connecting the chambers to control the clutch engagement pressure, and thereby limit the transmission of torsional vibrations, when the angular acceleration of the clutch is above a predetermined value, said valve means including a first member secured to said clutch for rotation therewith, a second member disposed for movement relative to said first member, one of said members having an opening therein to permit fluid communication between the chambers and the other member having a control portion to control fluid flow through the opening thereby controlling the engagement pressure, and a pair of spring means for connecting said first and second members for unitary movement when the angular acceleration is at or below the predetermined value to prevent fluid communication between said chambers and for permitting relative bidirectional movement between the members to permit fluid communication between said chambers independent of the direction of relative movement between said first member and said second members when the angular acceleration is above the predetermined value.

2. A release control valve for a torque converter lock-up clutch wherein engine generated torsional vibrations are imposed on the lock-up clutch resulting in angular acceleration of the lock-up clutch and wherein the lock-up clutch is engaged and disengaged by fluid pressure, the release control valve comprising; a valve body secured to a pressure plate of said lock-up clutch and having a valve bore with a centrally located opening and a longitudinal axis perpendicular to a radius of the pressure plate; an opening in said pressure plate aligned with said centrally located opening and cooperating therewith to connect the engagement and disengagement chambers of said lock-up clutch; a slidable valve member disposed in said valve bore; and resilient means positioning said valve member in said valve bore to normally close said centrally located opening relative to said valve bore, said valve member being responsive to angular acceleration of said pressure plate above a predetermined value to open said centrally located opening to said valve bore to interconnect the engagement and disengagement chambers to said clutch to control clutch engagement pressure to limit the transmission of the angular acceleration and torsional vibration by said pressure plate.

3. A control valve for a torque converter lock-up clutch wherein the clutch engagement is controlled by fluid pressure in chambers on oppposite sides of a pressure plate and wherein the clutch is subjected to engine torsional vibrations, said control valve comprising; valve means responsive to angular acceleration of the clutch for inter-connecting the chambers to control the clutch engagement pressure, and thereby limit the transmission of torsional vibrations, when the angular acceleration of the clutch is above a predetermined value, said valve means including a cup member secured to said clutch for rotation therewith, a disc member rotatably mounted within the cup member, passage means in said cup member and said disc member, and resilient means for connecting said cup and disc members for unitary movement and for maintaining the cup and disc member in a position to prevent fluid flow through said passage means when the angular acceleration is at or below the predetermined value and for permitting relative bidirectional movement between the cup and disc members and fluid flow through said passage means between said chambers when the angular acceleration is above the predetermined value thereby controlling the clutch engagement pressure.

* * * * *